US012208623B2

(12) United States Patent
Inaba

(10) Patent No.: US 12,208,623 B2
(45) Date of Patent: Jan. 28, 2025

(54) LIQUID REFILLING MECHANISM

(71) Applicant: CANON KABUSHIKI KAISHA, Tokyo (JP)

(72) Inventor: Takuro Inaba, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 18/057,024

(22) Filed: Nov. 18, 2022

(65) Prior Publication Data

US 2023/0166516 A1 Jun. 1, 2023

(30) Foreign Application Priority Data

Nov. 29, 2021 (JP) ................................ 2021-192911

(51) Int. Cl.
*B41J 2/175* (2006.01)

(52) U.S. Cl.
CPC ....... *B41J 2/17509* (2013.01); *B41J 2/17513* (2013.01)

(58) Field of Classification Search
CPC .... B41J 2/17509; B41J 2/17513; B41J 2/175; B41J 2/17506; B41J 2/1752; B41J 2/17523; B41J 2/17553; B41J 29/13; B41J 2/01
USPC ........................................................... 347/85
See application file for complete search history.

(56) References Cited

U.S. PATENT DOCUMENTS

2017/0087858 A1* 3/2017 Hayashi ............... B41J 2/17523

FOREIGN PATENT DOCUMENTS

JP 2020189455 A 11/2020

* cited by examiner

*Primary Examiner* — Jason S Uhlenhake
*Assistant Examiner* — Alexander D Shenderov
(74) *Attorney, Agent, or Firm* — Canon U.S.A., Inc. I.P. Division

(57) ABSTRACT

A liquid refilling mechanism includes a liquid container having an inlet and includes a liquid refilling container having a container main body and a nozzle portion to inject liquid in the container main body through the inlet and into the liquid container. The nozzle portion includes a leading end portion that projects outward from a center line of the nozzle portion and a nozzle projection portion positioned closer to the container main body than the leading end portion and that projects outward from an external wall surface of the nozzle portion. The inlet includes an insertion groove portion, a circumferential groove portion, and a fitting groove portion that extends from the circumferential groove portion and enables fitting of the liquid container and the nozzle projection portion. The circumferential groove portion extends from the insertion groove portion so that the nozzle projection portion is rotatable in a posture for liquid filling.

8 Claims, 11 Drawing Sheets

201
203
300
310
202A
202B
202C
202E
202F
202G
106
106A
106C
16
θ11

221
223
300
310
451
202A
202B
202C
202E
202F
106
106A
106C
16
θ11

LIQUID REFILLING MECHANISM

BACKGROUND

Field

The present disclosure relates to a liquid refilling mechanism for refilling a liquid ejection apparatus with liquid.

Description of the Related Art

Typically, a liquid ejection apparatus that ejects liquid such as ink includes a liquid container that contains liquid. Some liquid containers have large capacities, and can be refilled with liquid. Such a liquid ejection apparatus is provided with a liquid refilling container for refilling the liquid container with liquid as appropriate.

Japanese Patent Application Laid-Open No. 2020-189455 discusses a liquid refilling container for refilling a liquid container with liquid. The liquid container is refilled with liquid by insertion of a tip of the liquid refilling container into an inlet of the liquid container.

When refilling the liquid container with liquid, a user inserts the tip of the liquid refilling container into the inlet of the liquid container in a state where the liquid refilling container is inclined. That is, a liquid refilling mechanism is composed of the liquid container and the liquid refilling container. With this configuration, if the liquid refilling container is pulled out in a state where a nozzle is inclined downward when the liquid refilling container is taken out from the inlet after the refilling of the liquid container with liquid, there is a possibility that liquid drips from the inside of the nozzle.

SUMMARY

The present disclosure is directed to provision of a liquid refilling mechanism capable of preventing dripping of liquid from a nozzle of a liquid refilling container when the liquid refilling container is pulled out after refilling of a liquid container with liquid.

According to an aspect of the present disclosure, a liquid refilling mechanism includes a liquid container configured to contain liquid, and a liquid refilling container configured to refill the liquid container with the liquid, wherein the liquid container includes an inlet configured to receive injection of the liquid from the liquid refilling container, wherein the liquid refilling container includes a container main body and a nozzle portion, where the container main body is configured to contain the liquid with which the liquid container is refilled, and where the nozzle portion is configured to inject the liquid in the container main body into the liquid refilling container, wherein the nozzle portion includes a leading end projection portion and a nozzle external wall surface projection portion, where the leading end projection portion projects outward from a center line of the nozzle portion, and where the nozzle external wall surface projection portion is positioned closer to the container main body than the leading end projection portion and projects outward from an external wall surface of the nozzle portion, and wherein the inlet includes an insertion groove portion, a circumferential groove portion, and a fitting groove portion, where the insertion groove portion is configured to receive insertion of the leading end projection portion and the nozzle external wall surface projection portion, where the circumferential groove portion extends from the insertion groove portion in a circumferential direction of the inlet so that the nozzle external wall surface projection portion is rotatable in a posture for filling with the liquid, and where the fitting groove portion extends from the circumferential groove portion and enables fitting of the liquid container and the nozzle external wall surface projection portion.

Further features of the present disclosure will become apparent from the following description of exemplary embodiments with reference to the attached drawings.

DESCRIPTION OF THE EMBODIMENTS

A first exemplary embodiment of the present disclosure will be described below with reference to the drawings.

Figure 1:
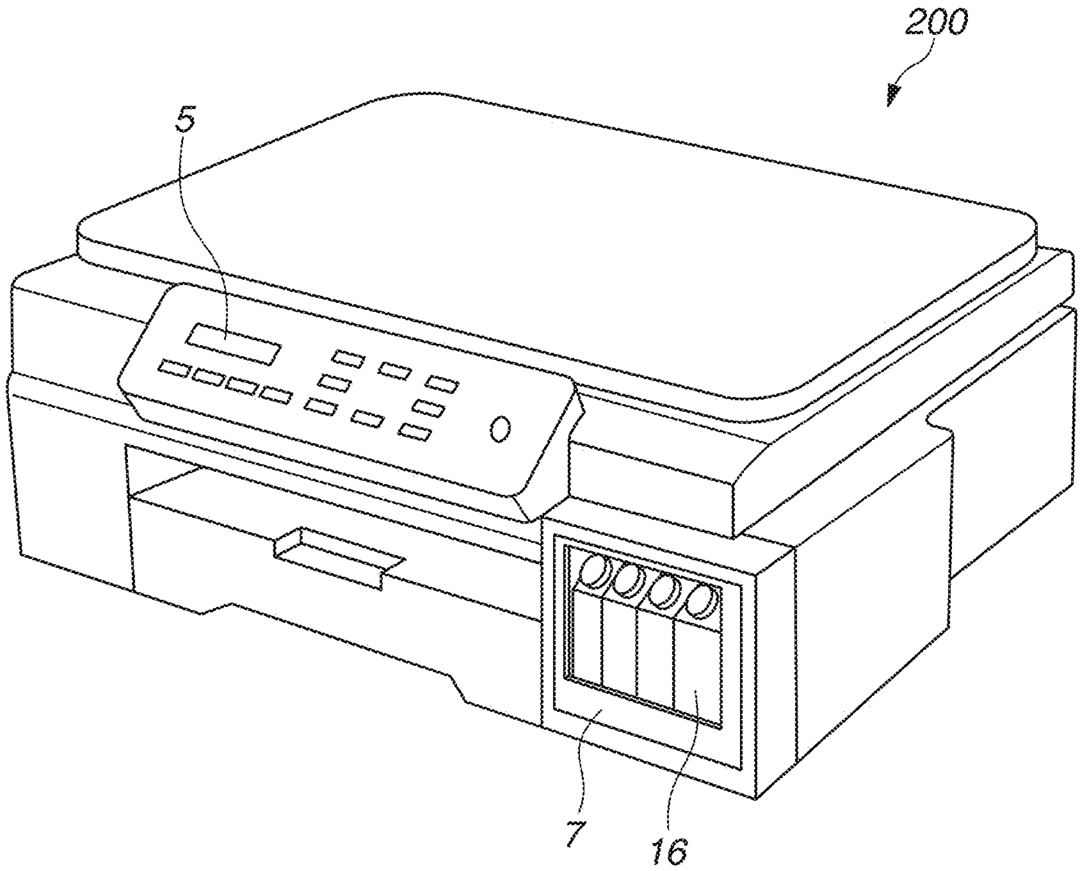
FIG. 1 is a perspective view illustrating a mechanism unit of a liquid ejection apparatus.
Figure 2:
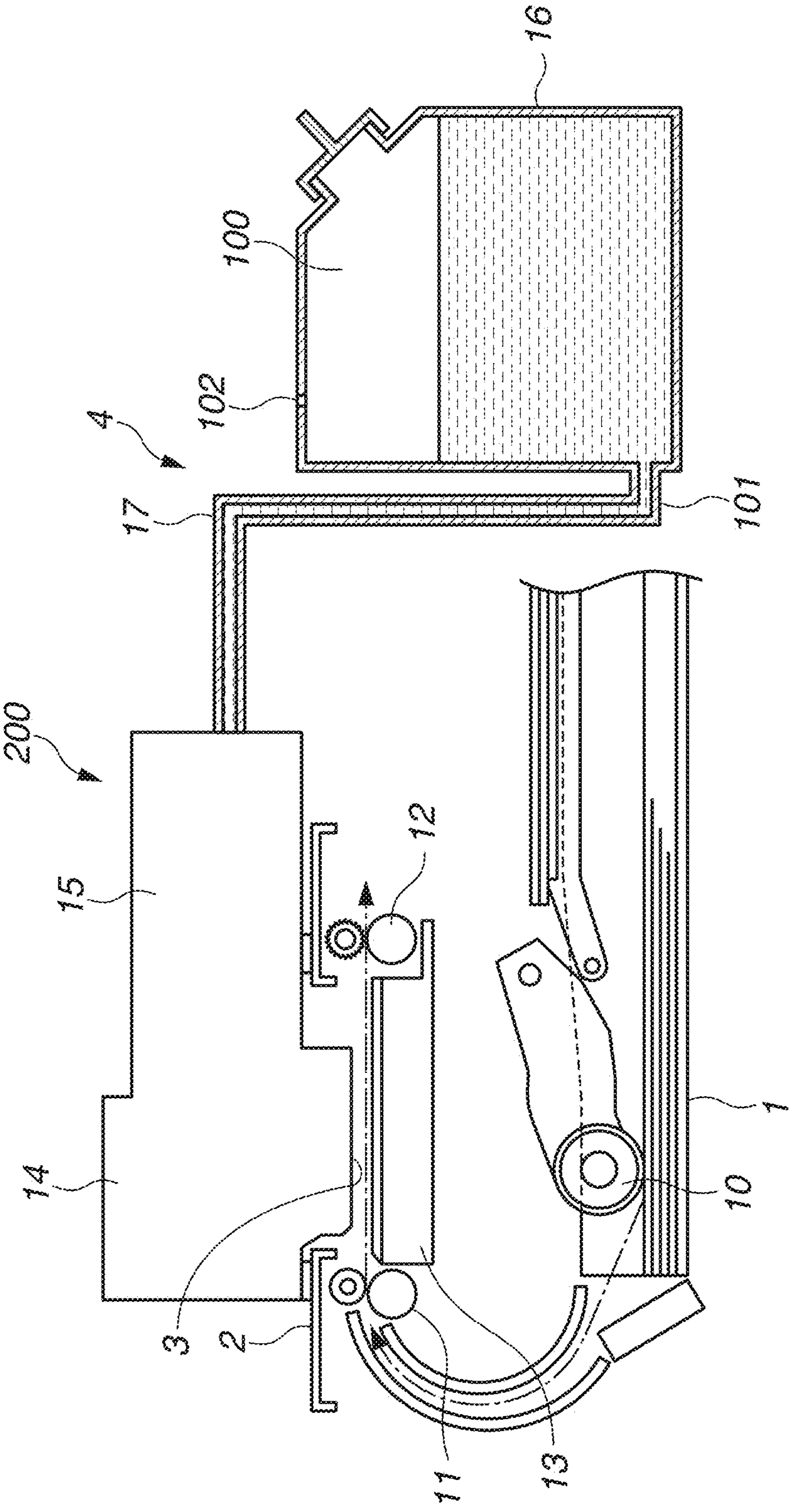
FIG. 2 is a cross-sectional view illustrating the liquid ejection apparatus.

FIG. 1 is a perspective view illustrating a mechanism unit of a liquid ejection apparatus 200 to which the present exemplary embodiment can be applied. FIG. 2 is a cross-sectional view illustrating the liquid ejection apparatus 200. The liquid ejection apparatus 200 includes a feed unit 1, a conveyance unit 2, an ejection unit 3, a supply unit 4, and a display unit 5. The feed unit 1 uses a feed roller 10 to separate a print medium one sheet by one sheet from a bundle of print media, and supplies the print medium to the conveyance unit 2. The conveyance unit 2 is arranged on a downstream side in a conveyance direction of the feed unit 1, and is provided with a platen 13 that holds the print medium between a conveyance roller 11 and a paper discharge roller 12. The conveyance unit 2 uses the conveyance roller 11, the paper discharge roller 12, and the like to convey the print medium fed by the feed roller 10.

The ejection unit 3 ejects liquid toward the print medium from a liquid ejection head 15 mounted on a carriage 14. The print medium conveyed by the conveyance unit 2 is supported by the platen 13 from vertically below. Ejecting liquid from the liquid ejection head 15 positioned vertically above forms an image based on image information. A liquid container 16 is capable of containing liquid therein. The supply unit 4 is configured to be capable of supplying liquid from a storage chamber 100 (containing chamber) of the liquid container 16 to the liquid ejection head 15 through a flow channel 101 and a flexible supply tube 17. In the present exemplary embodiment, liquid is ink. More specifically, four supply tubes 17, through which ink in respective colors (black, magenta, cyan, and yellow) flows, extend from the liquid container 16, and are connected to the liquid ejection head 15 in a bundled state. When liquid supplied to the liquid ejection head 15 is ejected from an ejection orifice of the liquid ejection head 15, liquid in an amount that is the same as that of ejected liquid is supplied from the liquid container 16 to the liquid ejection head 15. Then, air in a volume that is the same as that of liquid supplied to the liquid ejection head 15 flows from an atmosphere communication opening 102, which is arranged vertically above the liquid container 16, to the liquid container 16. The display unit 5 is used for notifying the user of a state of the liquid ejection apparatus 200 in operation or performing display when the user selects an operation.

Figure 3:
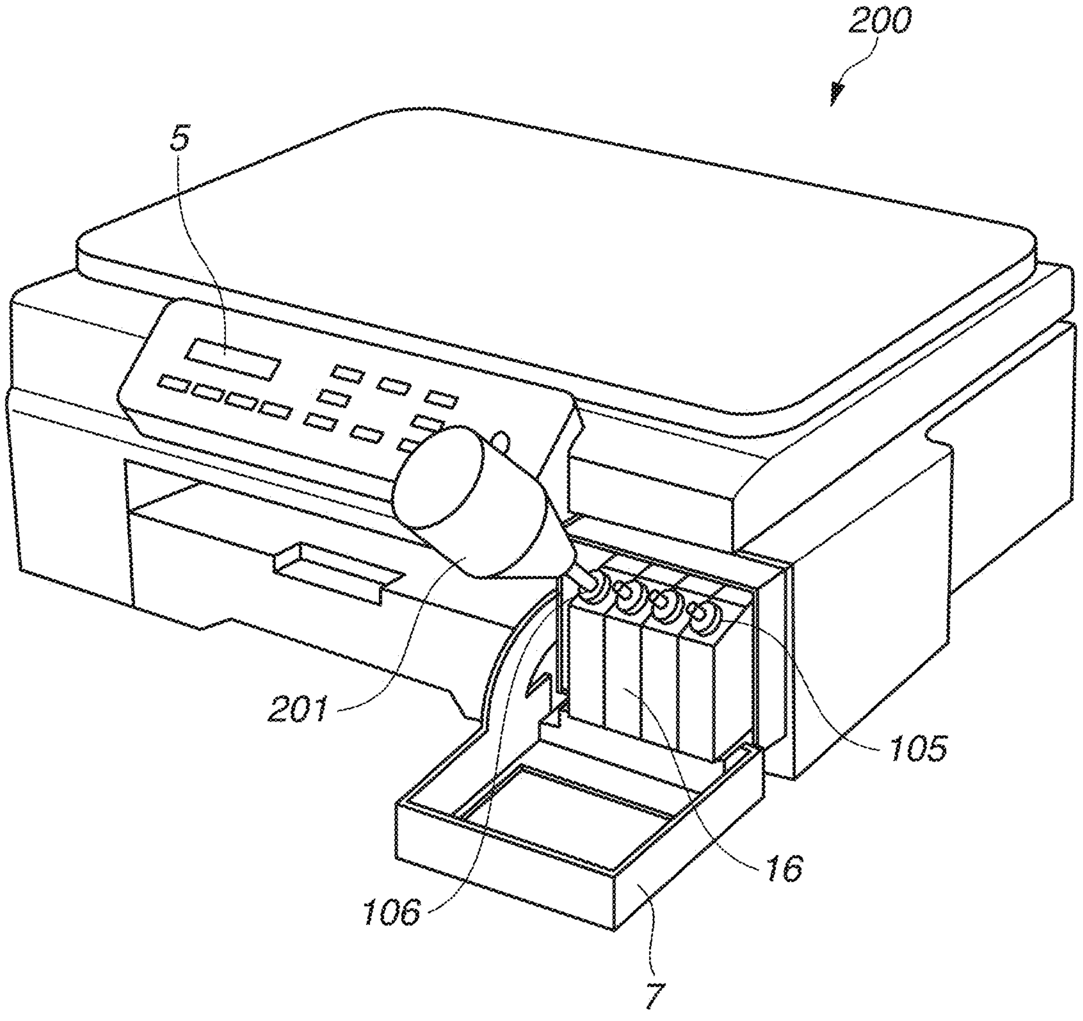
FIG. 3 is a perspective view illustrating the liquid discharge apparatus with which liquid is refilled by a liquid refilling container.

FIG. 3 is a perspective view illustrating the liquid ejection apparatus 200 with which liquid is refilled by a liquid refilling container 201. As illustrated in FIG. 3, in the liquid ejection apparatus 200 according to the present exemplary embodiment, when supplying liquid, the user opens a container cover 7, and supplies liquid from the liquid refilling container 201 to the inside of the storage chamber 100 through an inlet 106 arranged in the liquid container 16. The inlet 106 is provided with a plug member 105 that is detachable from the inlet 106. When performing refilling using the liquid refilling container 201, the user removes the plug member 105 of the inlet 106 and supplies liquid. A configuration of the liquid container 16 is not limited to the configuration in which the liquid container 16 is incorporated in the main body of the liquid ejection apparatus 200 like the present exemplary embodiment, and may be a configuration in which the liquid container 16 is arranged outside the main body of the liquid ejection apparatus 200 if liquid can be supplied from the liquid container 16 to the liquid ejection head 15.

Figure 4:
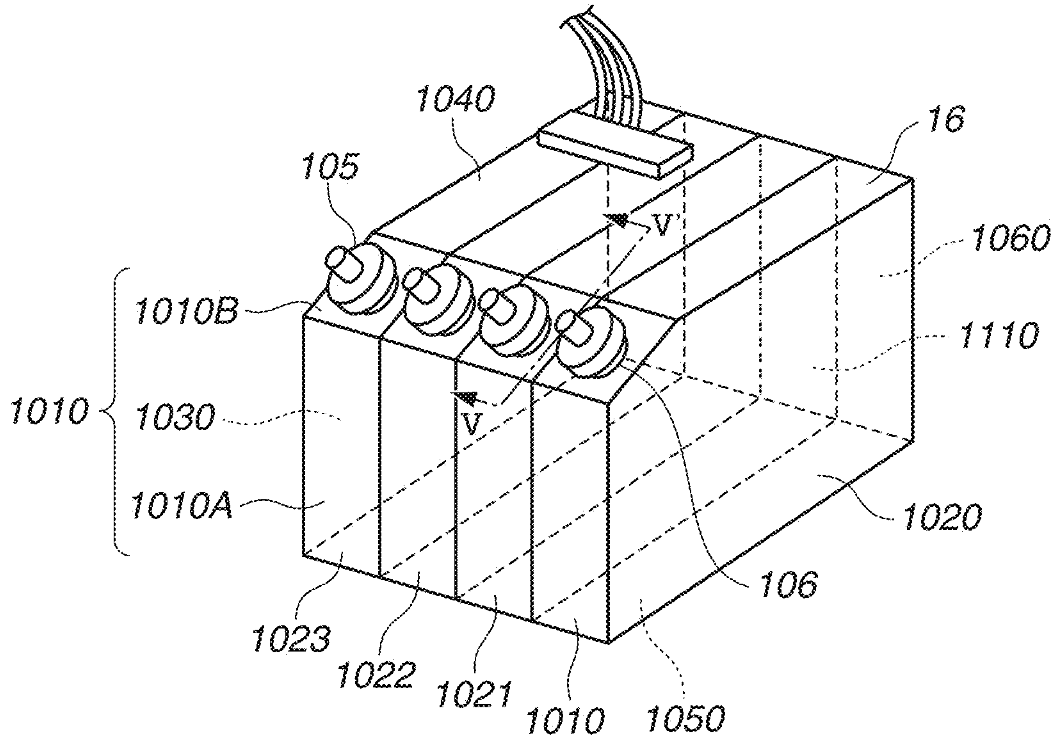
FIG. 4 is a perspective view illustrating a liquid container of the liquid ejection apparatus.

FIG. 4 is a perspective view illustrating the liquid container 16 of the liquid ejection apparatus 200 to which the present exemplary embodiment can be applied. The liquid container 16 according to the present exemplary embodiment is formed of a synthetic resin such as polypropylene, and has an external form of an approximately rectangular parallelepiped. The liquid container 16 has a front wall 1010, a right wall 1020, a left wall 1030, an upper wall 1040, and a lower wall 1050. The front wall 1010 is composed of a standing wall 1010A extending form the lower wall 1050 in an approximately vertical direction, and an inclined wall 1010B (one example of an external wall) that is connected to an upper end of the standing wall 1010A and that is inclined with respect to a vertical direction and a front-rear direction. The inclined wall 1010B is inclined with respect to the standing wall 1010A toward a rear side, and the inlet 106 is formed in this inclined wall 1010B.

Meanwhile, a rear surface of the liquid container 16 is open. A film 1060 is welded to rear end portions of the right wall 1020, the left wall 1030, inter-color walls 1021 to 1023, the upper wall 1040, and the lower wall 1050, whereby the liquid container 16 is sealed, and a rear wall serving as a rear surface is formed. That is, the rear wall of the liquid container 16 is formed by the film 1060. In this manner, a liquid chamber 1110 is formed.

Figure 5:
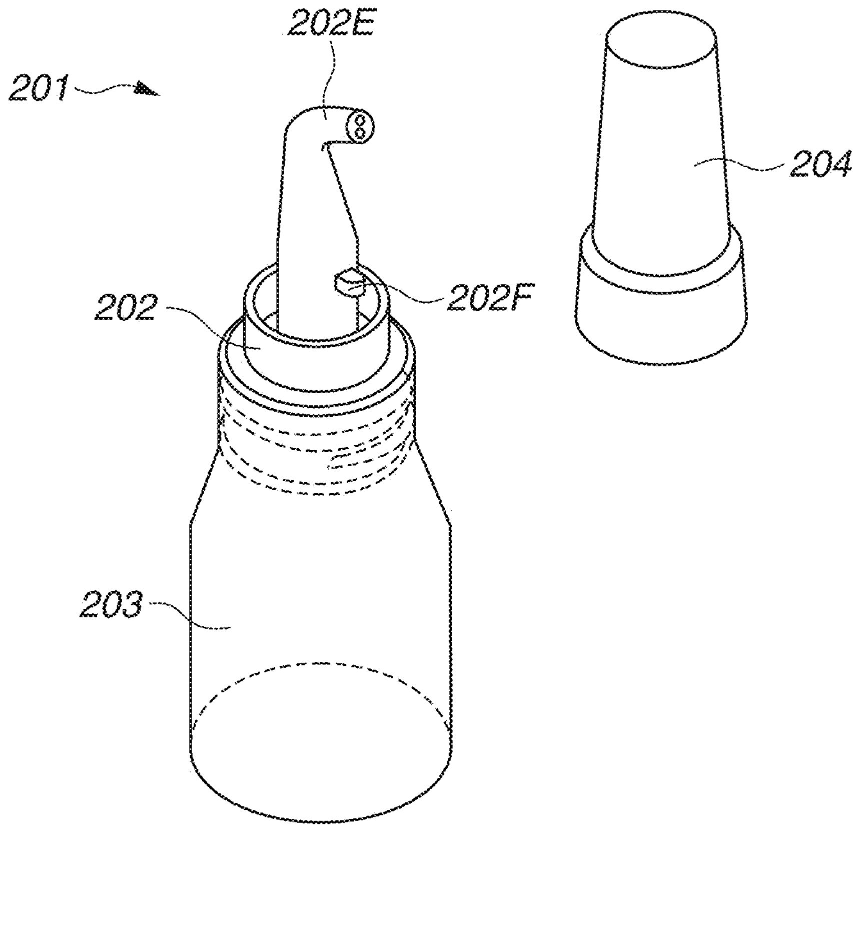
FIG. 5 is a perspective view illustrating a liquid refilling container according to a first exemplary embodiment of the present disclosure.

FIG. 5 is a perspective view illustrating the liquid refilling container 201 according to the first exemplary embodiment of the present disclosure. When performing refilling with liquid, the user removes a lid 204.

Figure 6A:
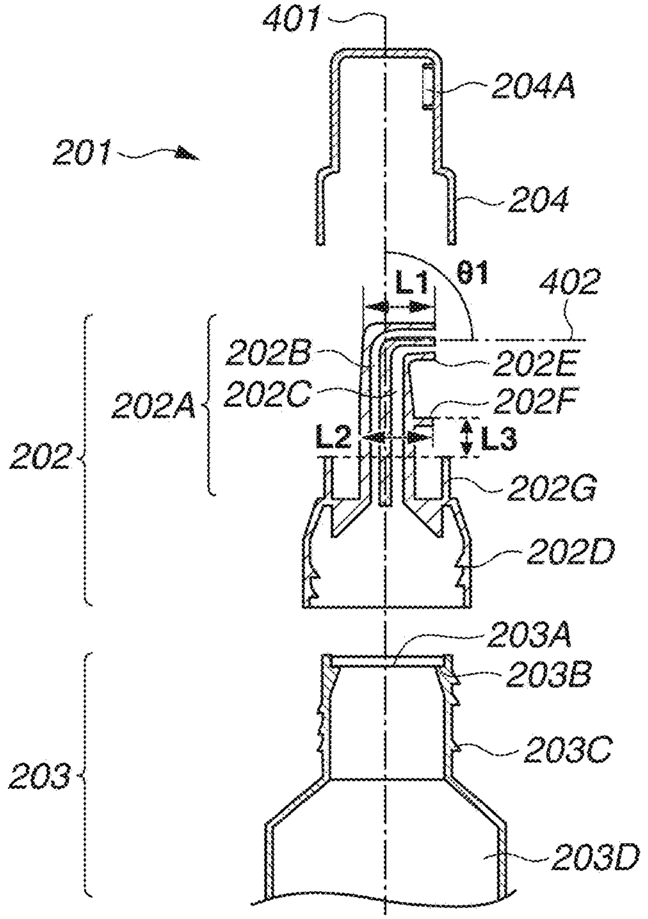
FIG. 6A is a main portion cross-sectional view illustrating a configuration of the liquid refilling container according to the first exemplary embodiment of the present disclosure.
Figure 6B:
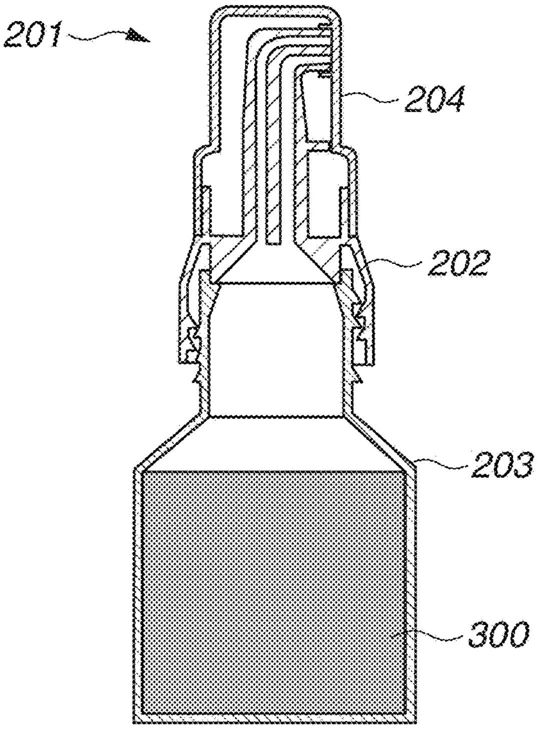
FIG. 6B is a cross-sectional view illustrating the liquid refilling container according to the first exemplary embodiment of the present disclosure.

FIGS. 6A and 6B are cross-sectional views each illustrating the liquid refilling container 201 according to the first exemplary embodiment of the present disclosure. FIG. 6A is a cross-sectional view illustrating components of the liquid refilling container 201. The liquid refilling container 201 in the present disclosure is composed of a container main body 203, a cap 202, and the lid 204. The container main body 203 is composed of an opening 203A for discharging ink, a cap receiving portion 203B, a screw portion 203C, and a containing chamber 203D that contains liquid.

The cap 202 includes a nozzle portion 202A, a screw portion 202D, and an outer circumferential raised portion 202G. A first flow channel 202B through which air flows and a second flow channel 202C through which liquid flows are formed inside the nozzle portion 202A. Further, a leading end projection portion 202E and a nozzle external wall surface projection portion 202F are formed in the nozzle portion 202A.

The leading end projection portion 202E projects outward from a center line 401 of the nozzle portion 202A (with a length L1 from a leading end to a rear end). An angle (leading end projection portion inclined angle) θ1 is formed between the center line 401 and a centroid line 402 between the first flow channel 202B and the second flow channel 202C inside the leading end projection portion 202E, and is approximately 90° in this example.

The nozzle external wall surface projection portion 202F is positioned on the container main body side when viewed from the leading end projection portion 202E, and projects outward from the nozzle external wall surface from the center line 401 of the nozzle portion 202A in a direction that is the same as the projection direction of the leading end projection portion 202E (with a length L2 from a leading end to a rear end). The leading end projection portion 202E and the nozzle external wall surface projection portion 202F are formed to have a relation of L1≈L2. A distance from an upper surface of the nozzle external wall surface projection portion 202F to an upper surface of the outer circumferential raised portion 202G is a distance L3.

The screw portion 202D is rotatably mounted while covering the opening 203A of the container main body. The outer circumferential raised portion 202G is formed to be engaged with the lid 204.

The lid 204 prevents leakage of liquid from the liquid refilling container 201, and a covering portion 204A that covers the leading end of the nozzle portion 202A is formed on an inner surface of an upper portion of the lid 204.

FIG. 6B is a cross-sectional view illustrating the liquid refilling container 201. Ink 300 as liquid is contained in the container main body 203. The container main body 203 and the cap 202 are rotatably mounted. The lid 204 is fitted with a pressure at the leading end of the cap 202.

Figure 7A:
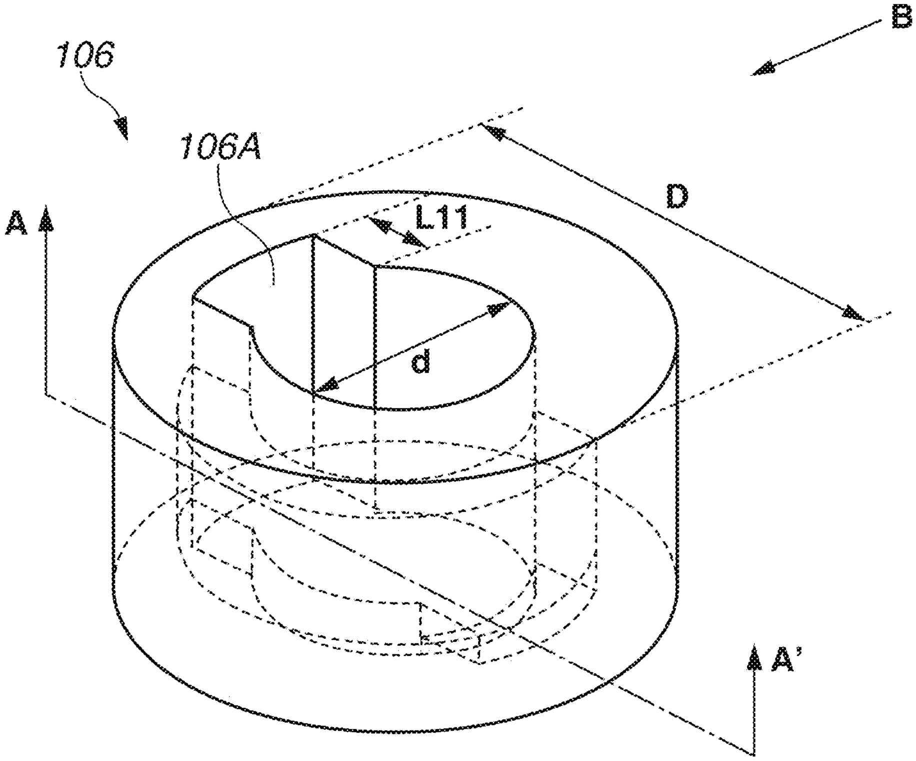
FIG. 7A is a perspective view illustrating a liquid inlet of a liquid container according to the first exemplary embodiment of the present disclosure.
Figure 7B:
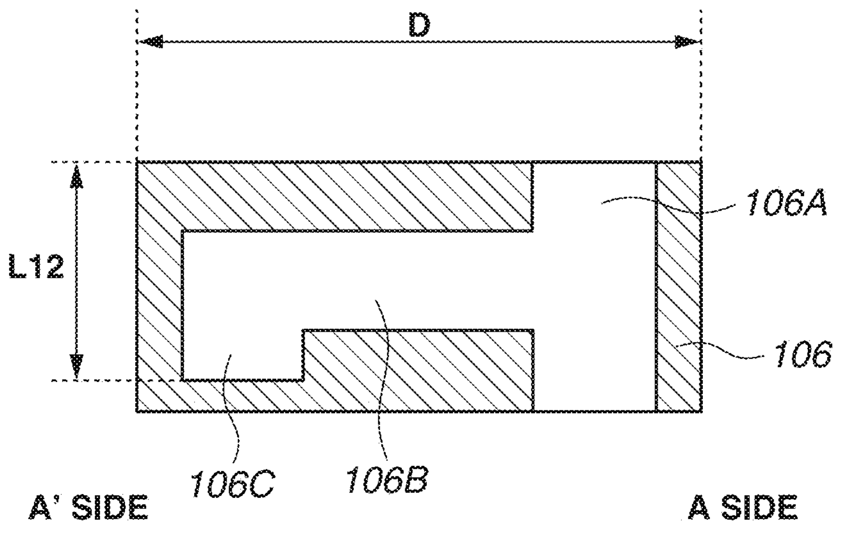
FIG. 7B is a cross-sectional view illustrating the liquid inlet of the liquid container according to the first exemplary embodiment of the present disclosure.

FIGS. 7A and 7B each illustrate the inlet 106 arranged in the liquid container 16 according to the first exemplary embodiment of the present disclosure. FIG. 7A is a perspective view illustrating the inlet 106 in a state where the plug member 105 is removed. FIG. 7B is a cross-sectional view when a cross-section along A-A' line in FIG. 7A is viewed in a direction of an arrow B. The inlet 106 has an external form D and an inner diameter d. An insertion groove portion 106A serving as an insertion passage for the liquid refilling container 201 at the time of refilling with liquid is arranged inside the inlet 106 (illustrated in FIGS. 7A and 7B). The insertion groove portion 106A is positioned on an upper side in a gravitational direction when viewed from a direction orthogonal to an open surface of the inlet 106, and penetrates in the direction orthogonal to the open surface. Furthermore, a circumferential groove portion 106B that extends from the insertion groove portion 106A in a circumferential direction of the inlet 106 is arranged so that the above-mentioned nozzle external wall surface projection portion 202F is rotatable in a state where the liquid refilling container 201 is inserted into the inlet 106. A fitting groove portion 106C is provided which extends downward in the gravitational direction from the circumferential groove portion 106B and to which the nozzle external wall surface projection portion 202F can be fitted in a state where the liquid refilling container 201 is in a posture for refilling the liquid container 16 with liquid. The fitting groove portion 106C is arranged to fix the liquid refilling container 201, and is a groove having a depth L12 from the open surface of the inlet 106 to a bottom surface of the fitting groove portion 106C to such an extent as not to penetrate the inside of the inlet 106. The insertion groove portion 106A, the circumferential groove portion 106B, and the fitting groove portion 106C each have a depth L11.

Dimensions mutually related to the liquid refilling container 201 and the inlet 106 are described with reference to FIGS. 6A, 6B, 7A, and 7B. The length L1 of the leading end projection portion 202E of the liquid refilling container 201 (FIG. 6A), the inner diameter d of the inlet 106, and the depth L11 of the insertion groove portion 106A (FIG. 7A) have a relation of $d<L1\leq d+L11$. The length L2 of the nozzle external wall surface projection portion 202F of the liquid refilling container 201 has a similar relation of $d<L2\leq d+L11$. The distance L3 from the upper surface of the nozzle external wall surface projection portion 202F of the liquid refilling container 201 to the upper surface of the outer circumferential raised portion 202G and the depth L12 from the open surface of the inlet 106 to the bottom surface of the fitting groove portion 106C (FIG. 7B) have a relation of $L3\geq L12$.

The liquid container 16 including the inlet 106 provided with the insertion groove portion 106A, the circumferential groove portion 106B, and the fitting groove portion 106C, and the liquid refilling container 201 including the above-mentioned leading end projection portion 202E and the nozzle external wall surface projection portion 202F constitute the liquid refilling mechanism according to the present exemplary embodiment. A liquid refilling method using the liquid refilling mechanism is now described with reference to FIGS. 8A to 8F. FIGS. 8A to 8F are cross-sectional views each illustrating a main portion of the liquid refilling mechanism, and illustrate processes for refilling with liquid in the order of FIGS. 8A to 8F.

Figures 8A, 8B, 8C, 8D, 8E, 8F:
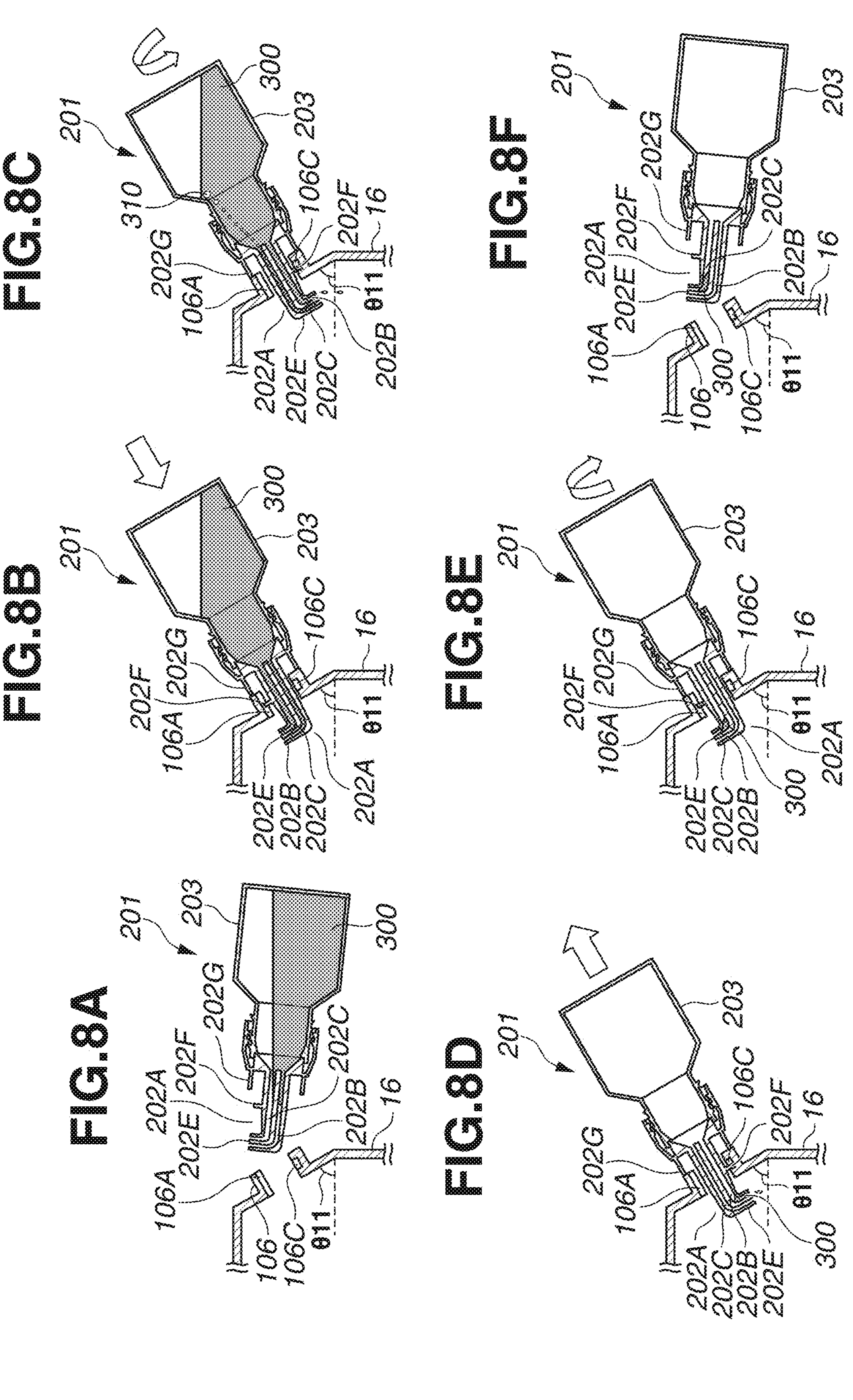
FIGS. 8A to 8F are main portion cross-sectional views illustrating the order of a liquid refilling method according to the first exemplary embodiment of the present disclosure.

As illustrated in FIG. 8A, the cap 202 of the liquid refilling container 201 that contains the ink 300 is removed, and the liquid refilling container 201 is brought close to the inlet 106 of the liquid container 16. At this time, the liquid refilling container 201 is brought close to and inserted into the inlet 106 of the liquid container 16 so that a position of the leading end projection portion 202E of the liquid refilling container 201 and a position of the insertion groove portion 106A of the inlet 106 are matched with each other, and the leading end projection portion 202E passes through the insertion groove portion 106A.

Subsequently, as illustrated in FIG. 8B, the leading end projection portion 202E of the liquid refilling container 201 is caused to further advance. At this time, similarly to the leading end projection portion 202E, the nozzle external wall surface projection portion 202F is also caused to pass through the insertion groove portion 106A and further advance. The nozzle external wall surface projection portion 202F is caused to advance until the position of the nozzle external wall surface projection portion 202F of the liquid refilling container 201 and the position of the circumferential groove portion 106B that extends from the insertion groove portion 106A are matched with each other and the nozzle external wall surface projection portion 202F is brought into a rotatable state. At this time, since the leading end projection portion 202E is positioned lower in the gravitational direction than a liquid surface of the ink 300 contained in the liquid refilling container 201, the ink 300 passes through the first flow channel 202B and the second flow channel 202C inside the nozzle portion 202A, and surges to the leading end.

Subsequently, as illustrated in FIG. 8C, after the nozzle external wall surface projection portion 202F is caused to advance until the position of the nozzle external wall surface projection portion 202F is matched with the position of the circumferential groove portion 106B that extends from the insertion groove portion 106A of the inlet 106 and the nozzle external wall surface projection portion 202F is brought into the rotatable state, the liquid refilling container 201 is rotated. A rotational direction is a direction in which the circumferential groove portion 106B extending from the insertion groove portion 106A is arranged in the circumferential direction of the inlet 106, and is a counter-clockwise direction as viewed from the front of the inlet 106. That is, the liquid refilling container 201 is rotated in the counter-clockwise direction so that the nozzle external wall surface projection portion 202F passes through the circumferential groove portion 106B. When the liquid refilling container 201 is rotated, the nozzle external wall surface projection portion 202F passes through the circumferential groove portion 106B, and thereafter reaches a dead end on a wall surface of the fitting groove portion 106C side of the inlet 106. When the nozzle external wall surface projection portion 202F reaches the dead end, the liquid refilling container 201 is caused to further advance, whereby the nozzle external wall surface projection portion 202F is fitted to the fitting groove portion 106C. With this operation, the liquid refilling container 201 is fixed in a posture for refilling the liquid container 16 with liquid. The leading end projection portion 202E faces downward in the posture for refilling the liquid container 16 with liquid, the liquid is discharged from the first flow channel 202B of the liquid refilling container 201, and the air flows from the second flow channel 202C at the same time. With such gas-liquid exchange action, the liquid container 16 included in the liquid ejection apparatus 200 is refilled with the ink 300 in the liquid refilling container 201.

Subsequently, as illustrated in FIG. 8D, if the liquid refilling container 201 keeps the posture for refilling the liquid container 16 with the liquid, the ink 300 is added to the inside of the liquid container 16 until the liquid refilling container 201 becomes empty of the ink 300. With the refilling, the ink 300 adheres to the first flow channel 202B serving as a discharge channel for the ink 300 due to the action of surface tension. In addition, gravity force also acts on the ink 300, and force for dripping downward is also applied to the ink 300. After completion of the refilling, the liquid refilling container 201 is pulled outward, and the nozzle external wall surface projection portion 202F is removed from the fitting groove portion 106C and moved until the position of the nozzle external wall surface projection portion 202F is matched with the position of the circumferential groove portion 106B and the nozzle external wall surface projection portion 202F is brought into the rotatable state.

Subsequently, as illustrated in FIG. 8E, after the nozzle external wall surface projection portion 202F is moved until the position of the nozzle external wall surface projection portion 202F and the position of the circumferential groove portion 106B are matched with each other and the nozzle external wall surface projection portion 202F is brought into the rotatable state, the liquid refilling container 201 is rotated. The rotational direction is the opposite direction of the above-mentioned direction (FIG. 8C), is a direction in which the nozzle external wall surface projection portion 202F is moved from the fitting groove portion 106C side, by way of the circumferential groove portion 106B, toward the insertion groove portion 106A side, and is a clockwise direction when viewed from the front of the inlet 106. That is, the liquid refilling container 201 is rotated in the clockwise direction so that the nozzle external wall surface projection portion 202F passes through the circumferential groove portion 106B. When the liquid refilling container 201 is rotated, the nozzle external wall surface projection portion 202F passes through the circumferential groove portion 106B, and thereafter reaches a dead end on a wall surface of the insertion groove portion 106A side of the inlet 106. At this time, the leading end projection portion 202E faces upward, which is the opposite direction of the direction of gravitational force acting on the ink 300 inside the first flow channel 202B, and an inner wall of the first flow channel 202B is in a state of retaining the ink 300 inside the nozzle portion 202A due to the projection of the leading end. This prevents the act of dripping of the adhering ink 300 from the inside of the nozzle portion 202A to the outside.

Subsequently, as illustrated in FIG. 8F, after the liquid refilling container 201 is rotated in the clockwise direction, the liquid refilling container 201 is pulled out from the inlet 106 of the liquid container 16 so that the nozzle external wall surface projection portion 202F and the leading end projection portion 202E pass through the insertion groove portion 106A.

The longer the length L1 of the leading end projection portion 202E of the liquid refilling container 201 (refer to FIG. 6A), the more preferable. This is because a more amount of the ink 300 can be retained within the nozzle portion 202A in the state where the liquid refilling container 201 is rotated after refilling the liquid container 16 with the liquid and the leading end projection portion 202E faces upward (refer to FIG. 8E).

The shorter the distance L3 from the upper surface of the nozzle external wall surface projection portion 202F of the liquid refilling container 201 to the upper surface of the outer circumferential raised portion 202G (refer to FIG. 6A), the more preferable in terms of fixing the posture of the liquid refilling container 201. In the posture of the liquid refilling container 201 for refilling the liquid container 16 with liquid (refer to FIGS. 8C and 8D), the nozzle external wall surface projection portion 202F of the liquid refilling container 201 serves as a supporting point for supporting the posture. At this time, the center of gravity of the liquid refilling container 201 is present on the container main body 203 side.

Hence, when the distance L3 from the upper surface of the nozzle external wall surface projection portion 202F to the upper surface of the outer circumferential raised portion 202G becomes shorter, the supporting point and center of gravity of the liquid refilling container 201 become closer to each other, whereby the liquid refilling container 201 can be more stably fixed.

While the leading end projection portion inclined angle $\theta 1$ of the leading end projection portion 202E (refer to FIG. 6A) is not limited to approximately 90°, a relation of $90° - \theta 11 \leq \theta 1 \leq 180° - \theta 11$ is preferably satisfied in terms of the inclined angle $\theta 11$ of the external wall surface of the liquid container 16 (refer to FIGS. 8A to 8F). In the state where the liquid refilling container 201 is rotated after refilling the liquid container 16 with the liquid and the leading end projection portion 202E faces upward (refer to FIG. 8E), the leading end projection portion 202E faces the horizontal direction when $\theta 1$ is $90° - \theta 11$. At this time, force starts to act in such a direction as to prevent the ink 300 inside the first flow channel 202B from dripping from the inside of the nozzle portion 202A to the outside. In a similar state (refer to FIG. 8E), when $\theta 1$ is $180° - \theta 11$, the leading end projection portion 202E faces the vertical direction. At this time, force to prevent the ink 300 inside the first flow channel 202B from dripping from the inside of the nozzle portion 202A to the outside, that is, downward force in the gravitational direction, reaches the maximum. When a relation of $\theta 1 > 180° - \theta 11$ holds, the action of preventing the ink 300 from dripping to the outside becomes weaker again than when $\theta 1$ is $180° - \theta 11$. In contrast, in the posture of the liquid refilling container 201 for refilling the liquid container 16 with the liquid (refer to FIG. 8D), when $\theta 1$ is $90° - \theta 11$, that is, the leading end projection portion inclined angle $\theta 1$ is small, the ink 300 easily runs out of the liquid refilling container 201, and the refilling is smoothly performed. Hence, in a case where the refilling with ink is wanted to be performed smoothly while the action of preventing dripping of ink is caused to act at a minimum, the leading end projection portion inclined angle $\theta 1$ is decreased and approximated to $90° - \theta 11$. In a case where the action of preventing dripping of ink is caused to act at a maximum, the leading end projection portion inclined angle $\theta 1$ is increased and approximated to $180° - \theta 11$.

According to the liquid refilling mechanism of the present exemplary embodiment described above, in a state where the ink 300 adhering to the inside of the first flow channel 202B in the nozzle portion 202A is retained in the leading end projection portion 202E at the time of refilling, the liquid refilling container 201 is pulled out from the liquid container 16. This can prevent dripping of liquid from the inside of the nozzle when the user pulls out the liquid refilling container after performing refilling with liquid.

A second exemplary embodiment of the present disclosure will be described below with reference to the drawings. In the following description, a part that is similar to that in the first exemplary embodiment is denoted by the same reference sign, and a detailed description thereof is omitted.

Figure 9:
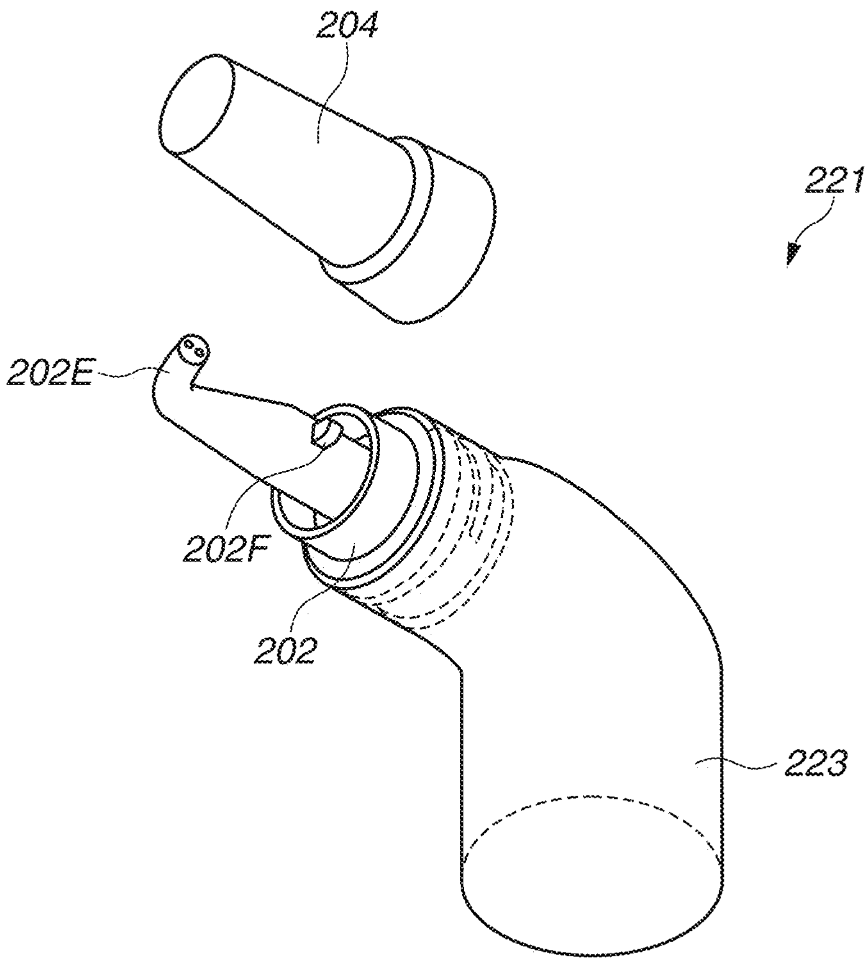
FIG. 9 is a perspective view illustrating a liquid refilling container according to a second exemplary embodiment of the present disclosure.

FIG. 9 is a perspective view illustrating a liquid refilling container 221 according to the second exemplary embodiment of the present disclosure. A container main body 223 is partially bended. When performing refilling with liquid, the user removes the lid 204 similarly to the first exemplary embodiment.

Figure 10:
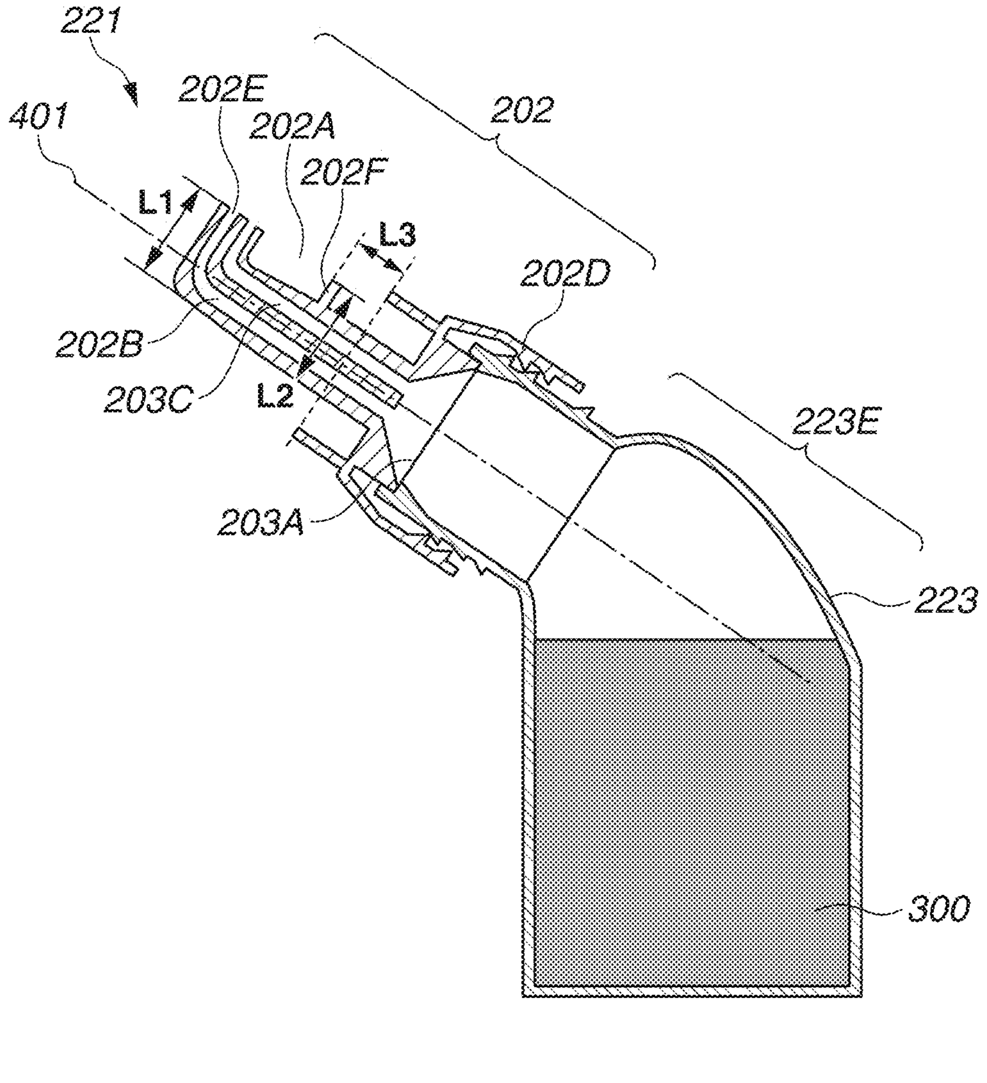
FIG. 10 is a main portion cross-sectional view illustrating the liquid refilling container according to the second exemplary embodiment of the present disclosure.

FIG. 10 is a main portion cross-sectional view illustrating the liquid refilling container 221. A bend portion 223E is formed in the container main body 223. The bend portion 223E is bent in such a shape as that, when viewed from the center line 401 of the nozzle portion 202A, a portion thereof in a direction identical to the projection direction of the leading end projection portion 202E and the nozzle external wall surface projection portion 202F is the longest in the cross section and a portion thereof in the opposite direction of the projection direction is the shortest in the cross section. That is, the container main body 223 is bent on the opposite side of the formation side of the nozzle portion 202A.

The liquid container 16 including the inlet 106 provided with the insertion groove portion 106A, the circumferential groove portion 106B, and the fitting groove portion 106C, and the liquid refilling container 221 including the above-mentioned leading end projection portion 202E and the nozzle external wall surface projection portion 202F constitute the liquid refilling mechanism according to the present exemplary embodiment. A liquid refilling method using the liquid refilling mechanism is now described with reference to FIGS. 11A to 11F. FIGS. 11A to 11F are cross-sectional views each illustrating a main portion of the liquid refilling mechanism, and illustrate processes for refilling with liquid in the order of FIGS. 11A to 11F.

Figures 11A, 11B, 11C, 11D, 11E, 11F:
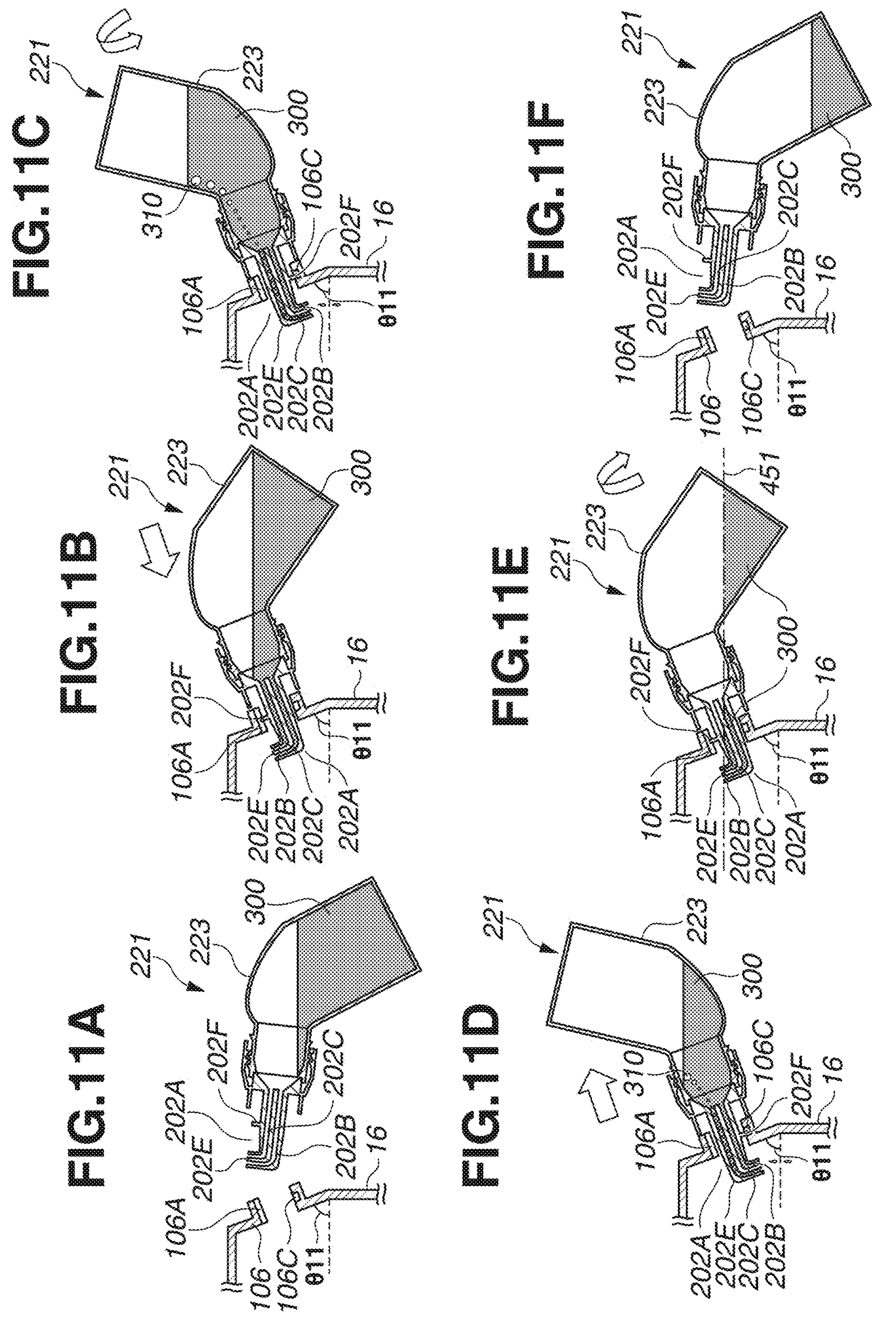
FIGS. 11A to 11F are main portion cross-sectional views illustrating the order of a liquid refilling method according to the second exemplary embodiment of the present disclosure.

As illustrated in FIG. 11A, similarly to the first exemplary embodiment (FIG. 8A), the liquid refilling container 221 is inserted so that the leading end projection portion 202E passes through the insertion groove portion 106A.

Subsequently, as illustrated in FIG. 11B, similarly to the first exemplary embodiment (FIG. 8B), the liquid refilling container 221 is caused to further advance so that the nozzle external wall surface projection portion 202F passes through the insertion groove portion 106A.

Subsequently, as illustrated in FIG. 11C, similarly to the first exemplary embodiment (FIG. 8C), the liquid refilling container 221 is rotated and caused to further advance, the nozzle external wall surface projection portion 202F is fitted to the fitting groove portion 106C, and the liquid refilling container 221 is fixed in the posture for refilling the liquid container 16 with liquid. Then, the gas-liquid exchange action acts, and the liquid container 16 included in the liquid ejection apparatus 200 is refilled with the ink 300 in the liquid refilling container 221.

Subsequently, as illustrated in FIG. 11D, the refilling is stopped in a state where the ink 300 remains in the liquid refilling container 221, thereafter, similarly to the first exemplary embodiment (FIG. 8D), the liquid refilling container 221 is pulled outward, and the nozzle external wall surface projection portion 202F is removed from the fitting groove portion 106C. The nozzle external wall surface projection portion 202F is moved until the position of the nozzle external wall surface projection portion 202F is matched with the position of the circumferential groove portion 106B and the nozzle external wall surface projection portion 202F is brought into the rotatable state.

Subsequently, as illustrated in FIG. 11E, similarly to the first exemplary embodiment (FIG. 8E), the nozzle external wall surface projection portion 202F is moved until the position of the nozzle external wall surface projection portion 202F and the position of the circumferential groove portion 106B are matched with each other and the nozzle external wall surface projection portion 202F is brought into the rotatable state. Thereafter, the liquid refilling container 221 is rotated in the clockwise direction so that the nozzle external wall surface projection portion 202F passes through the circumferential groove portion 106B. When the liquid refilling container 221 is rotated, the remaining ink 300 is left in the nozzle portion 202A and the container main body 223 because the refilling is stopped halfway through as illustrated in FIG. 11D. After the rotation, the liquid refilling container 221 has a volume portion that is positioned lower than a horizontal straight line 451 that passes through the leading end of the first flow channel 202B due to the formation of the bend portion 223E in the container main body 223. The presence of this volume portion prevents the ink 300 from surging from the inside of the nozzle portion 202A to the outside even if a remaining amount of the ink 300 after the refilling is larger than that in the case of the first exemplary embodiment. This prevents the action of dripping of adhering ink or remaining ink.

Subsequently, as illustrated in FIG. 11F, similarly to the first exemplary embodiment (FIG. 8E), the liquid refilling container 201 is, after rotated in the clockwise direction, pulled out from the inlet 106 of the liquid container 16.

According to the liquid refilling mechanism of the present exemplary embodiment described above, similarly to the first exemplary embodiment, the liquid refilling container 221 is pulled out from the liquid container 16 at the time of refilling in a state where the ink 300 adhering to the inside of the first flow channel 202B in the nozzle portion 202A is retained in the leading end projection portion 202E. Furthermore, the formation of the bend portion 223E in the container main body 223 of the liquid refilling container 221 prevents the ink 300 from surging from the inside of the nozzle portion 202A to the outside even if a remaining amount of the ink 300 after the refilling is larger. In this manner, it is possible to prevent dripping of liquid from the inside of the nozzle when the user pulls out the liquid refilling container after performing refilling with liquid.

The present disclosure enables provision of the liquid refilling mechanism capable of preventing dripping of liquid from the nozzle of the liquid refilling container when the liquid refilling container is pulled out after refilling of the liquid container with liquid.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-192911, filed Nov. 29, 2021, which is hereby incorporated by reference herein in its entirety.

What is claimed is:

1. A liquid refilling mechanism comprising:

a liquid container configured to contain liquid; and a liquid refilling container configured to refill the liquid container with the liquid, wherein the liquid container includes an inlet configured to receive injection of the liquid from the liquid refilling container, wherein the liquid refilling container includes a container main body and a nozzle portion, where the container main body is configured to contain the liquid with which the liquid container is refilled, and where the nozzle portion is configured to inject the liquid in the container main body into the liquid container, wherein the nozzle portion includes a leading end projection portion and a nozzle external wall surface projection portion, where the leading end projection portion projects outward from a center line of the nozzle portion, an opening that is in communication with an inside of the container main body is formed in the leading end projection portion, and where the nozzle external wall surface projection portion is positioned closer to the container main body than the leading end projection portion and projects outward from an external wall surface of the nozzle portion, and wherein the inlet includes an insertion groove portion, a circumferential groove portion, and a fitting groove portion, where the insertion groove portion is configured to receive insertion of the leading end projection portion and the nozzle external wall surface projection portion, where the circumferential groove portion extends from the insertion groove portion in a circumferential direction of the inlet so that the nozzle external wall surface projection portion is rotatable in a posture for filling with the liquid, and where the fitting groove portion extends from the circumferential groove portion and enables fitting of the liquid container and the nozzle external wall surface projection portion.

2. The liquid refilling mechanism according to claim 1, wherein the nozzle external wall surface projection portion projects in a direction identical to a direction in which the leading end projection portion projects outward from a center of the nozzle portion.

3. The liquid refilling mechanism according to claim 1, wherein an angle formed between a direction in which the leading end projection portion projects and the center line of the nozzle portion is 90°.

4. The liquid refilling mechanism according to claim 1, wherein the nozzle portion includes a first flow channel and a second flow channel, wherein the first flow channel connects the opening with the container main body.

5. The liquid refilling mechanism according to claim 1, wherein, the following relation is satisfied, $$90° - \theta 11 \leq \theta 1 \leq 180° - \theta 11,$$

where θ1 is an angle formed between the center line of the nozzle portion and a direction in which the leading end projection portion projects and θ11 is an inclined angle of an external wall surface of the liquid container.

6. The liquid refilling mechanism according to claim 1, wherein the container main body is bent on an opposite side of a formation side of the nozzle portion.

7. The liquid refilling mechanism according to claim 1, wherein the insertion groove portion, the circumferential groove portion, and the fitting groove portion are formed inside the inlet.

8. The liquid refilling mechanism according to claim 1, wherein the insertion groove portion is formed along a direction in which the nozzle portion is inserted into the inlet, and wherein the circumferential groove portion is formed along a direction orthogonal to the direction in which the nozzle portion is inserted into the inlet.

* * * * *